(No Model.)
W. F. BRADBURY.
CUTTING ROLLER FOR TUBE CLEANERS.
No. 532,358. Patented Jan. 8, 1895.
*Fig. I.*
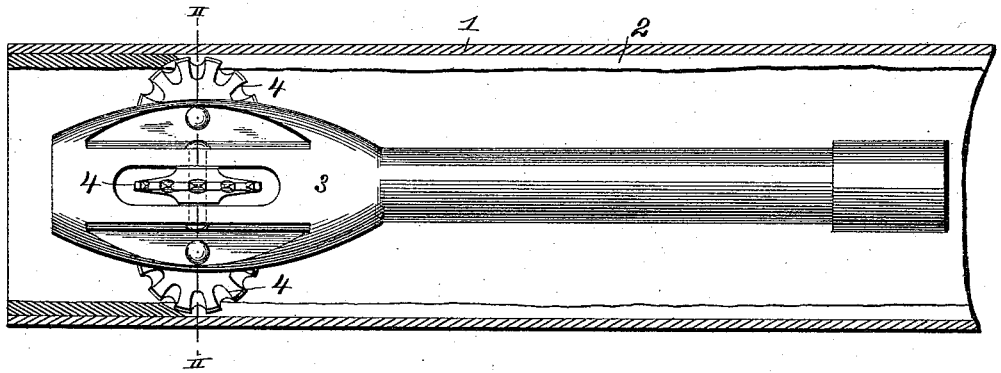
*Fig. II.*
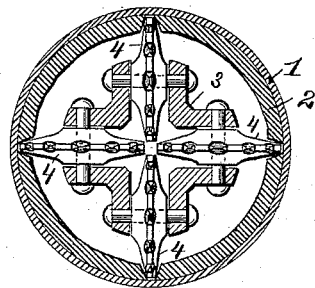
*Fig. III.*
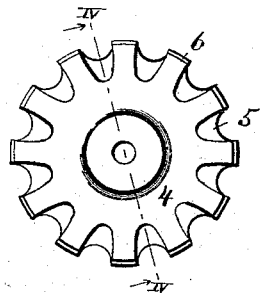
*Fig. IV.*
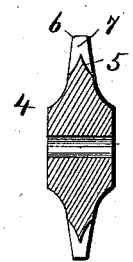
Witnesses:
L. G. Fischer
H. O. Fields
Inventor
Wm. F. Bradbury
By Knight Bros
Attys.

UNITED STATES PATENT OFFICE.

WILLIAM F. BRADBURY, OF KANSAS CITY, MISSOURI.

CUTTING-ROLLER FOR TUBE-CLEANERS.

SPECIFICATION forming part of Letters Patent No. 532,358, dated January 8, 1895.

Application filed May 5, 1894. Serial No. 610,202. (No model.)

*To all whom it may concern:*

Be it known that I, WILLIAM F. BRADBURY, of Kansas City, in the county of Jackson and State of Missouri, have invented certain new and useful Improvements in Cutting-Rollers for Tube-Cleaners, of which the following is a full, clear, and exact description, reference being had to the accompanying drawings, which form a part of this specification.

My invention relates to certain new and useful improvements in cutting rollers for tube cleaners and has more especial reference to the cutting rollers to be used in my improved tube cleaner, Letters Patent for which, numbered 507,965, were issued to me October 31, 1893; and my invention consists in certain features of novelty hereinafter described and pointed out in the claims.

Figure I,— represents a longitudinal section of a boiler tube with a tube cleaner therein provided with my improved cutting rollers and showing also the scale formed in the tube. Fig. II,— represents a cross section on the line II—II of Fig. I. Fig. III,— represents my improved cutting roller. Fig. IV,— represents a cross section on the line IV—IV of Fig. III.

Similar numerals refer to similar parts throughout the several views.

1,— represents a cross section of a boiler tube. 2,— is the scale formed therein. 3,— is the rigid head to which a series of cutting rollers 4, are journaled. The perimeter of the cutting roller is provided with the cutting edges 5, alternating with the abruptly terminating disintegrating blunt portions 6.

The cutting edges may be made concave as shown or otherwise as may be desired. They are beveled as shown in Fig. IV, and where joining the blunt portions do not reach quite to the perimeter leaving an acute disintegrating angle as shown at 7 in Fig. IV. 8 is the body of the cutting roller.

The advantages of my new improvement are that by providing the blunt disintegrating portion 6, I avoid cutting the tube which frequently happens with a cutting disk having a cutting edge upon its entire perimeter. I find also that with such disintegrating blunt portion alternating with the cutting edges the cutting roller acts more forcibly and effectually upon the incrustation of the tube and more fully breaking up its adhesion thereto.

Having thus fully described my improvement, what I claim as my invention, and desire to secure by Letters Patent, is—

1. A cutting roller for tube cleaners having upon its perimeter cutting edges alternating with abruptly terminating disintegrating blunt portions; substantially as shown and described and for the purpose specified.

2. A cutting roller for tube cleaners having upon its perimeter cutting edges alternating with blunt disintegrating portions the cutting edges where joining the blunt portion not reaching to the perimeter thereof, but leaving an acute disintegrating angle; substantially as shown and described and for the purpose specified.

3. A cutting roller for tube cleaners consisting of a body, cutting edges upon the perimeter thereof and blunt disintegrating portions alternating with the cutting edges; substantially as shown and described and for the purpose specified.

4. In a tube cleaner the combination of a rigid head with cutting rollers journaled therein, cutting edges upon the perimeter of the roller and blunt disintegrating portions alternating with the cutting edges; substantially as shown and described and for the purpose specified.

WILLIAM F. BRADBURY.

Witnesses:
A. C. BROWN,
M. O. FIELDS.